Feb. 26, 1963 T. A. RIANDA 3,078,891
SEED POTATO CUTTER
Filed Oct. 3, 1961 4 Sheets-Sheet 1
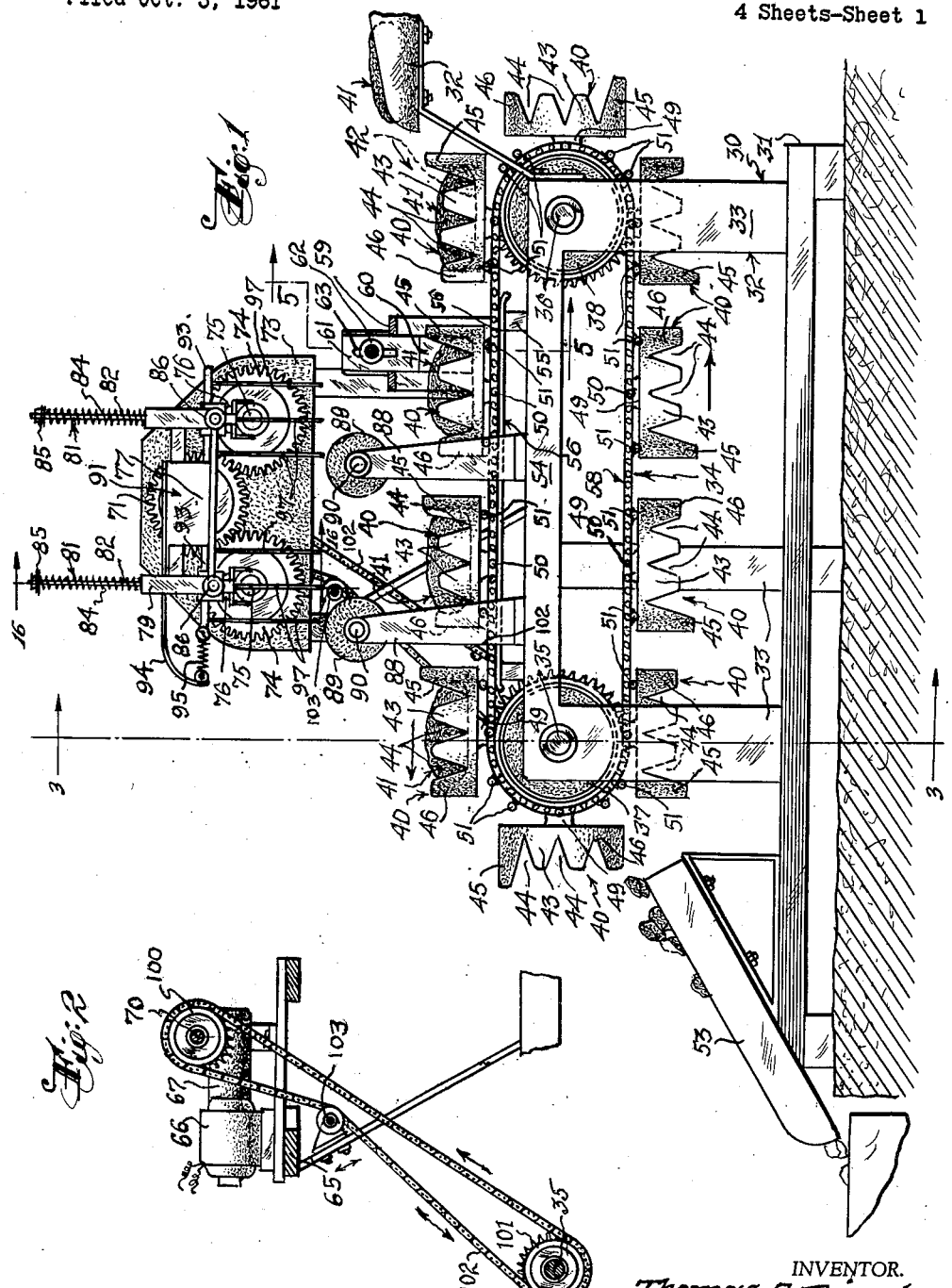
INVENTOR.
Thomas A. Rianda
BY Victor J. Evans & Co.
ATTORNEYS.

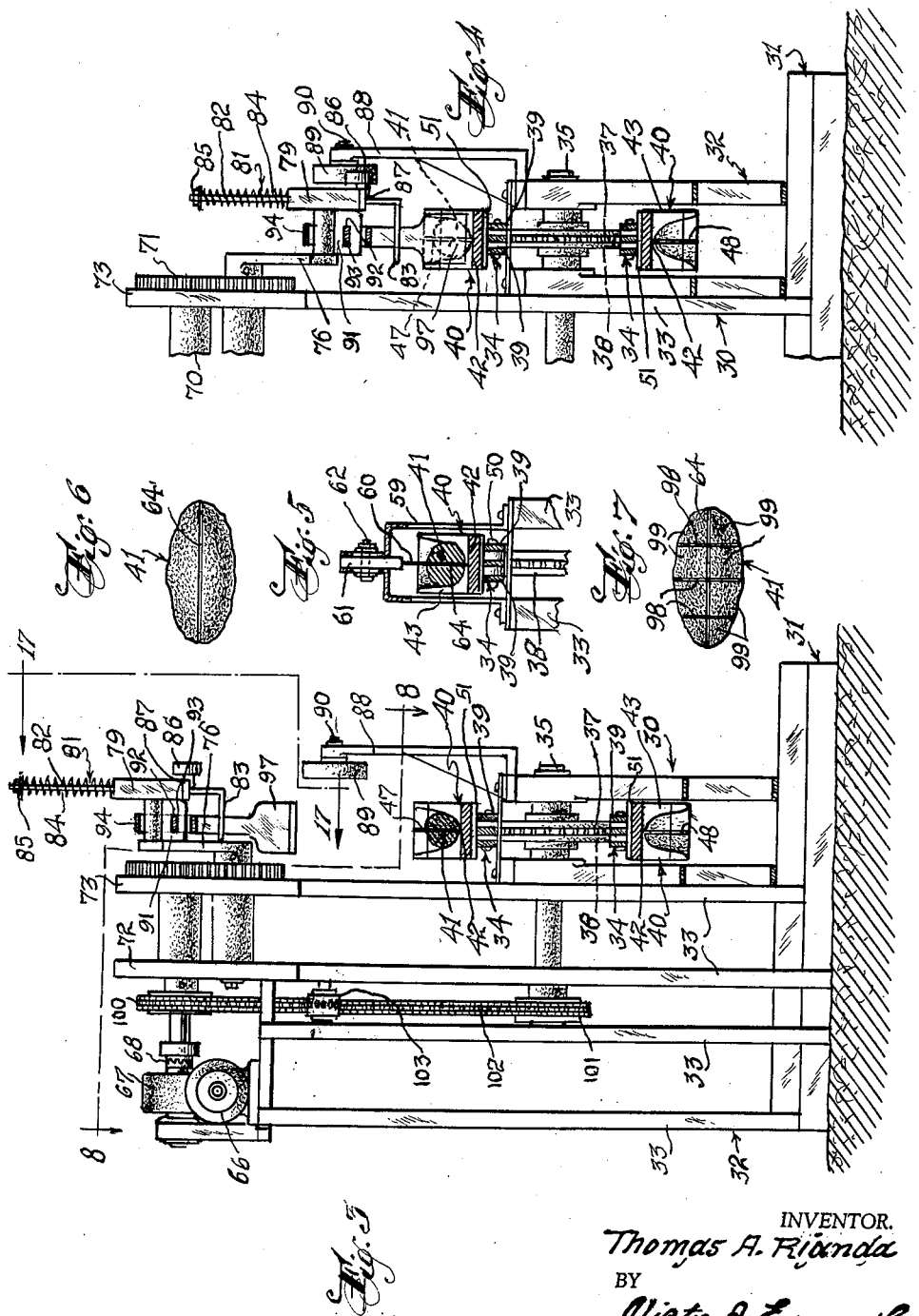

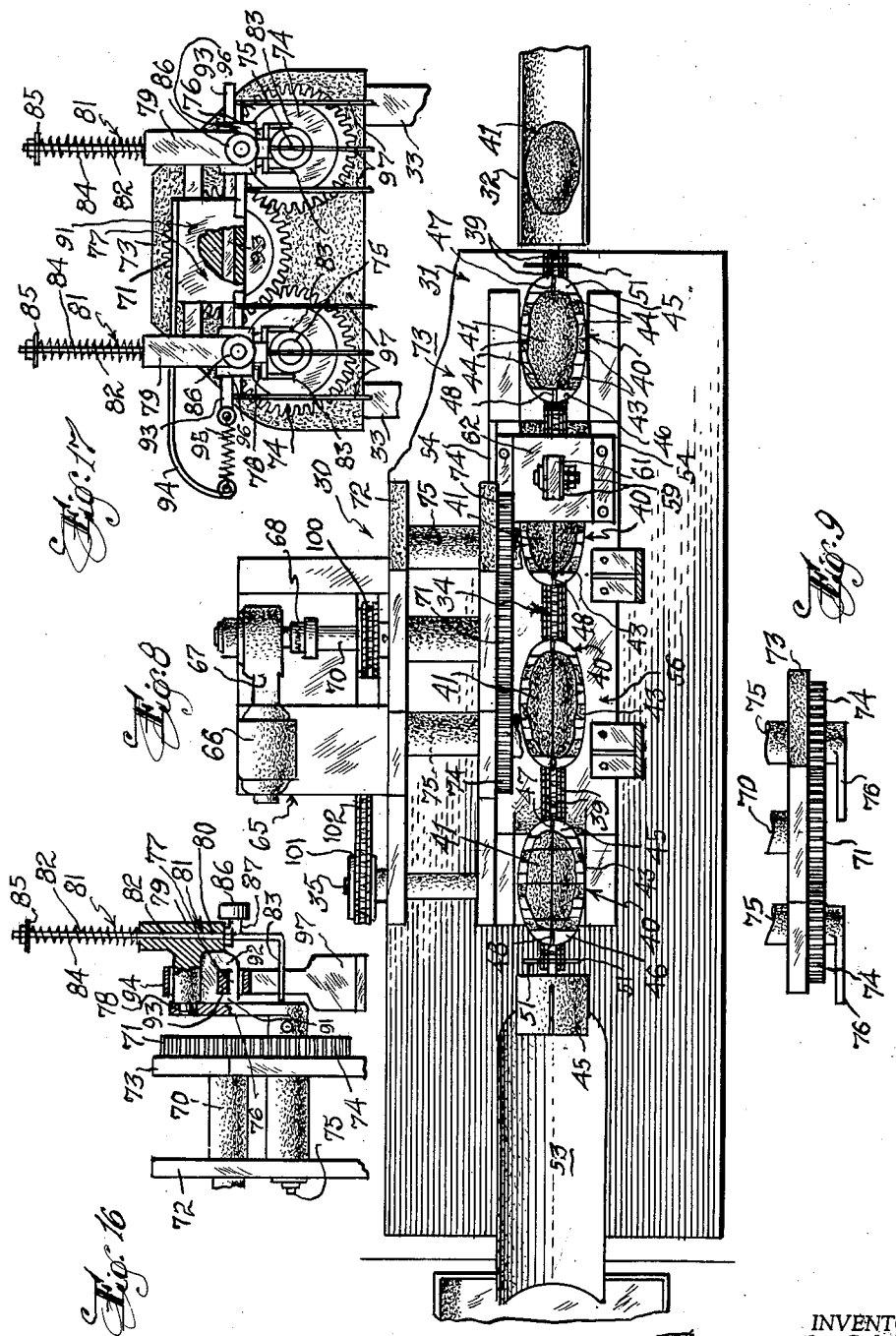

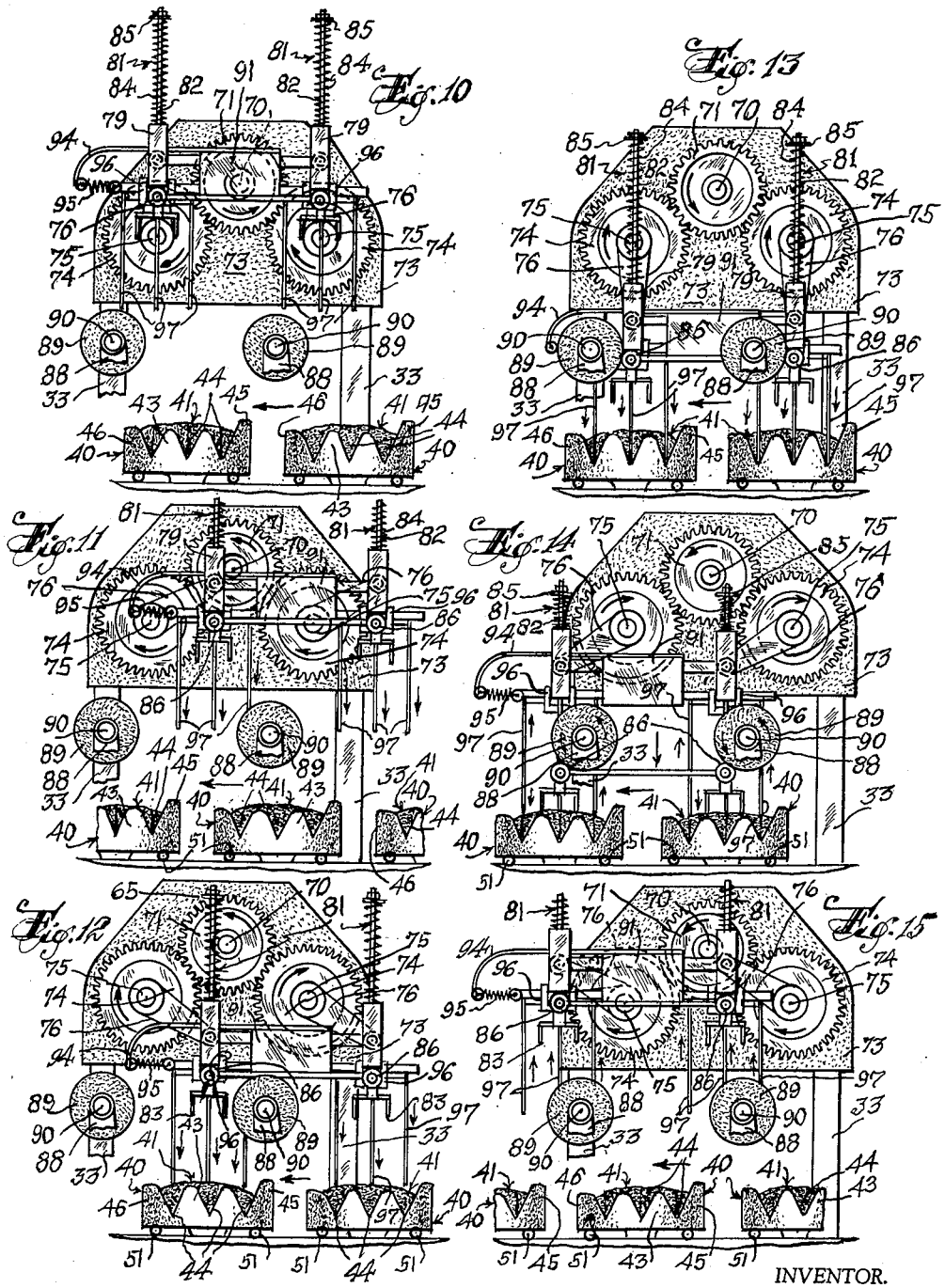

United States Patent Office 3,078,891
Patented Feb. 26, 1963

3,078,891
SEED POTATO CUTTER
Thomas A. Rianda, Box 39, Gonzales, Calif.
Filed Oct. 3, 1961, Ser. No. 142,685
3 Claims. (Cl. 146—78)

The present invention relates to a cutting machine or apparatus, and more particularly to an apparatus for facilitating the cutting of seed potatoes.

An object of the present invention is to provide a potato cutter which is adapted to be used for conveniently and expeditiously cutting a plurality of potatoes into segments or small sections whereby such segments or sections can be conveniently used as seed potatoes for planting in the ground.

Another object is to provide a seed potato cutter which is constructed so that potatoes can be supplied from a suitable source of supply and wherein these potatoes are adapted to be received in cups or pots, the potatoes being conveyed or carried into engagement with a stationary knife so that a longitudinal cut is made in each potato, and wherein subsequently a plurality of knives or blades are adapted to move down into engagement with the potatoes in the cup to provide transverse slits or cuts in the potatoes so that the potatoes will be cut in the desired manner, and wherein there is provided a holding means for retaining the potatoes in the cups during withdrawal of the blades from the potatoes, and wherein after the potatoes have been cut in the desired manner, they are adapted to be conveniently automatically discharged into a chute or other member for subsequent turning in the ground.

Another object is to provide an apparatus of the character described that may be utilized speedily and with precision by even inexperienced operators.

Further objects and advantages are to provide improved elements and arrangements thereof in a device of the character described that is economical to produce, durable in form, and condusive to the most economical use of materials and uniformity of members formed therefrom.

Still further objects and advantages will become apparent in the subsequent description in the specification.

In the drawings:

FIGURE 1 is a side elevational view of the seed potato cutter of the present invention.

FIGURE 2 is a fragmentary view, with parts broken away and in section, showing the driving means from the motor to the conveyor and associated parts.

FIGURE 3 is a sectional view taken generally on the line 3—3 of FIGURE 1 and showing the blades in raised position.

FIGURE 4 is a fragmentary elevational view, with parts broken away and in section, similar to FIGURE 3, but showing the blades in lowered position at the time of cutting of the potatoes.

FIGURE 5 is a sectional view taken generally on the line 5—5 of FIGURE 1.

FIGURE 6 is a top plan view of a potato after the first longitudinal cut has been made therein by the stationary knife.

FIGURE 7 is a top plan view of a potato after all the cuts have been made therein by the knife and blades.

FIGURE 8 is a sectional view taken on the line 8—8 of FIGURE 3.

FIGURE 9 is a fragmentary elevational view showing a part of the mechanism for actuating the blades.

FIGURES 10 through 15 are diagrammatic views showing the sequence of operation or movement of the parts such as the blades during use of the machine.

FIGURE 16 is an enlarged sectional view taken on the line 16—16 of FIGURE 1, and with parts broken away.

FIGURE 17 is an enlarged sectional view taken on the line 17—17 of FIGURE 3, and with parts broken away and in section.

Referring in detail to the drawings, the numeral 30 indicates the potato cutter of the present invention which is shown to comprise a horizontally disposed base 31, FIGURE 1, and there is further provided a frame or framework which is indicated generally by the numeral 32, and the frame 32 includes upstanding posts 33 which have their lower ends suitably affixed to the base 31. The machine 30 further includes an endless conveyor which is indicated generally by the numeral 34, and as shown in the drawings the conveyor 34 includes drive and driven shafts 35 and 36 which are supported by the frame 32, and sprockets 37 and 38 are suitably mounted on the shafts 35 and 36. The conveyor 34 further includes an endless chain 39 which is arranged in engagement with the teeth of the sprockets 37 and 38, and operatively connected to the chain 39 is a plurality of spaced apart similar cups 40, and these cups 40 are adapted to receive the potatoes 41 therein which are to be cut up to provide segments or sections for use as seed potatoes to be planted in the ground or the like.

As shown in the drawings the cups 40 include a bottom portion 42 as well as spaced apart side portions 43, and the side portions 43 are provided with diametrically opposed V-shaped slots 44 therein for a purpose to be later described, and each cup 40 further includes spaced apart end portions 45 and 46 and the end portions are provided with diametrically opposed slits or slots 47 and 48 therein. The cups 40 are connected to the chain 39 by means of lugs 49 which are formed integral with the bottom portion 42, and the lugs 49 are connected as for example by means of pins or securing elements 50 to the links of the chain 39.

Suitably affixed to the chain 39 is a plurality of spaced parallel pins 51 which are adapted to be used for helping to steady the cups 40 as the conveyor is moved or actuated.

In FIGURE 1 the numeral 32 indicates a portion of a hopper or bin which is adapted to be used for supplying the potatoes to be cut up and in FIGURE 1 the numeral 53 indicates an inclined chute which is arranged to receive the cut up portions of the potatoes whereby the cut up portions can be discharged from the chute 53 into a suitable receptacle or the like for planting in the ground or the like.

As shown in the drawings there is provided spaced apart side pieces 54 for the conveyor 34, and the numeral 55 indicates support elements which extend upwardly from the side pieces 54 and which are secured thereto or formed integral therewith, and there is provided a horizontally disposed platform or bed plate 56 which is suitably affixed to the upper portions of the support elements 55, and the platform 56 is arranged below the intermediate portion of the upper run or reach 57 of the conveyor chain 39, and in FIGURE 1 the numeral 58 indicates the lower run or reach of the conveyor chain 39.

The numeral 59 indicates a support unit which is suitably affixed to a portion of the framework of the machine, and the support unit 59 serves to support a vertically disposed stationary knife 60, and as shown in the drawings such as in FIGURES 1 and 5 the knife 60 includes an upwardly disposed portion 61 which is provided with a slit or elongated recess 63 for the projection therethrough of a bolt or securing element 62, and the provision of the elongated recess 63 provides a means whereby the position of the knife 60 can be adjusted or varied as desired, and a nut or the like is adapted to be arranged on the bolt or securing element 62 so that the knife 60 can be maintained immobile or stationary in its various adjusted positions. The stationary knife 60 is adapted to register with the slots 47 and 48 in the end positions 45 and 46 of the cups 40 so that with the potatoes positioned in the cups 40 and with the conveyor chain 49 traveling in a counter-clockwise direction, FIGURE 1, it will be seen that as the potatoes 41 are carried along by the cups 40, the knife 60 will form or will make the first cut 64 which is arranged longitudinally in the potato 41, FIGURE 6.

There is further provided a horizontally disposed shelf or support piece 65 which is suitably affixed to the frame 32, and the numeral 66 indicates a motor such as a conventional electric motor which is suitably mounted on the support piece 65, FIGURE 3, and the motor 66 is operatively connected to a gear reducer 67, and a shaft 70 is driven from the gear reducer 67, and a slip clutch 68 is operatively connected to the shaft 70. With the present invention a gear head motor of the correct speed and horsepower is adapted to be used, and the gear reducer may include a motor case having a worm gear or reduction therein. The slip clutch 68 is provided so that in the event the machine clogs up it will not break any parts before the motor is shut off. A gear member 71 is suitably keyed or otherwise affixed to the shaft 70. The shaft 70 is adapted to extend through vertically disposed spaced parallel plates 72 and 73 which are an integral part of the upper portion of the frame 32. The gear member 71 has teeth which mesh with teeth on the outer periphery of a pair of similar gear wheels 74, and the gear wheels 74 are suitably connected to a shaft 75 which are supported by the plates 72 and 73, for a purpose to be later described. Cranks 76 are operatively connected to the shafts 75, and the pair of cranks 76 are pivotally connected to a body member 77 as at 78, FIGURE 16. The body member 77 includes a pair of spaced apart bushings 79 which each have an elongated bore or opening 80 therein, and rods 81 have straight portions or stem portions 82 slidably arranged in the bores 80. As shown in the drawings a pair of spaced parallel fingers 83 are arranged at right angles with respect to each stem portion 82, and a coil spring 84 is circumposed on the upper end of each stem portion 82, and each coil spring 84 is retained in position by means of stop members 85.

Rollers 86 are connected to the stem portions 82 of the rods 81 as at 87, and these rollers 86 are mounted for movement into and out of engagement with wheels or rollers 89, and the wheels 89 are supported on brackets 88 as for example by means of pins or axles 90.

The body member 77 includes an enlargement 91 which is provided with an opening or recess 92 therein, FIGURE 17, and a bar 93 is adjustably or slidably arranged in the opening 92. The numeral 94 indicates an arm which is integral with the body member 77, and a spring member 95 serves to connect an end of the arm 94 to the bar 93.

As shown in the drawings a pair of spaced apart U-shaped clamps or yokes 96 are suitably affixed to the bar 93, and depending from each of the clamps 96 is a plurality of spaced parallel blades 97, and the blades 97 are adapted to selectively register with the slots 44 in the side portions of the cups 40 so as to form the transverse cuts 98 in the potatoes whereby the cuts 98 and 64 define or provide the segments or sections 99 therebetween for subsequent use as seed potatoes.

There is also provided a means for driving the conveyor 34 from the motor 66, and this means comprises a sprocket 100 on the shaft 70, and there is provided a corresponding sprocket 101 on the shaft 35, and an endless chain 102 is arranged in engagement with the sprockets 100 and 101, FIGURES 2 and 3. The numeral 103 indicates a sprocket which is arranged in engagement with the chain 102 and the sprocket 103 serves to keep the slack out of the chain 102.

From the foregoing, it is apparent that there has been provided a machine which is especially suitable for use in cutting seed potatoes, and in use with the parts arranged as shown in the drawings, it will be seen that the potatoes which are to be cut are adapted to be supplied from the hopper or member 52, FIGURE 1, and the potatoes are deposited one at a time in the individual cups 40. The power for operating the machine is supplied from the motor 66, and the motor 66 may be connected to a suitable source of electrical energy by means of a wire or the like, and with the motor 66 operating, it will be seen that the gear reducer 67 will be actuated which in turn causes rotation of the shaft 70. Since the shaft 70 has the sprocket 100 thereon, and with the chain 102 trained over the sprocket 100 and also trained over the sprocket 101 of the shaft 35, it will be seen that this will result in rotation of the shaft 35. The sprocket 103 is adapted to be used for keeping slack from the chain 102.

With reference to FIGURE 1, the shaft 35 is adapted to be rotated in a counter-clockwise direction and this causes corresponding counter-clockwise rotation of the sprocket 37, and since the chain 39 is arranged in engagement with the sprocket 37, it will be seen that the chain 39 will likewise travel in a counter-clockwise direction, FIGURE 1, the chain 39 being also arranged in engagement with the idler sprocket 38 which is supported on the shaft 36. As this counter-clockwise movement of the chain 39 takes place, the cups 40 will likewise travel in a counter-clockwise direction, FIGURE 1, and the parts are timed or constructed and arranged so that as an empty cup 40 moves into a position contiguous to the hopper 52, a potato 41 will be deposited into the cup 40, and the potatoes are therefore moved from right to left in FIGURE 1. As the potatoes are carried along by the cups 40, they move into engagement with the stationary knife 60 whereby a longitudinal cut 64 is first formed or made in a potato 41, as for example as shown in FIGURE 6.

As the potato continues to travel from right to left in FIGURE 1, it will be seen that the transverse cuts 98 will next be made in the potatoes, whereby the transverse cuts 98 and the longitudinal cuts 64 will coact to define or provide therebetween segments or sections 99 as shown in FIGURE 7, and these individual segments or sections are adapted to be conveniently used as seed potatoes in the usual manner. The machine of the present invention is constructed so that after the segments 99 are made, the cups will move to dumping position as for example as shown in the extreme left end of FIGURE 1, whereby the cut segments 99 will drop out by gravity into the chute 53, and from the chute 53 the segments can be loaded into a bin, container or other receptacle or other member. The empty cups 40 continue to travel around along with the conveyor chain 39 so that as shown in FIGURE 1 the empty cups 40 move along the bottom reach 58 of the conveyor 34 and move to a position contiguous to the hopper 52 ready to receive an additional potato so that the machine operates in a continuous automatic manner to form the desired segments or sections for use as seed potatoes to be planted in the ground.

FIGURES 10 through 15 illustrate diagrammatically the sequence of operation in making the transverse cuts 98 in the potatoes after the longitudinal cut 64 has been made. Thus, it will be seen that as the motor 66 is actuated, the gear reducer 67 will be actuated and this will cause rotation of the gear 71, and since the gear 71 meshes with the pair of gears 74 on the shafts 75, it will be seen that this actuation of the gear reducer 67 by the motor 66 will cause corresponding rotation of the gears 74. The pair of cranks 76 are affixed to the shafts 75 so that as the shafts 75 rotate, the cranks 76 rotate or move, and since the cranks 76 are pivotally connected as at 78 to the body member 77, it will be seen that the cranks 76 will operate to have a movement corresponding to the links of a parallelogram, and there will be a corresponding reciprocation or movement of the body member 77. Since the bar 93 is carried by the body member 77, and since the two sets of blades 97 are connected to the bar 93 as at 96, it will be seen that this oscillation or movement of the body member 77 will cause up and down movement of the blades 97, and the blades 97 make the cuts 98 in the potatoes 41. The parts are synchronized in such a manner that as a pair of cups 40 are in position below the blades 97, the blades 97 will move downwardly at the proper time to make the transverse cuts 98 in the potatoes. Also, it is to be noted that a pair of potatoes are cut simultaneously, and there are two sets or groups of blades 97, and each set or group of blades 97 have three blades therein.

It is to be noted that the bar 93 which provides a support for the two sets of blades 97 can move or slide a small distance in the opening 92 of the enlargement 91 on the body member 77, and the arm 94 is connected to the bar 93 by means of a spring 95. The provision of the spring 95 and the slidable support for the bar 93 helps insure that breakage of the parts will be minimized or eliminated since for example if the blades 97 happen to come down into cutting position and do not properly register with the slots 44, then the spring 95 will permit sufficient "give" or flexibility to insure that the parts will not break during such action. The spring 95 helps maintain the bar 93 and its associated parts properly centered or aligned during use of the machine of the present invention. It is to be noted that the slots 44 have a generally V-shape and such V-shape provides sufficient clearance for the blades 97 so that the blades 97 can properly move downwardly to make the transverse cuts 98 and this is because the blades 97 are not moving in a straight up and down path but are moving in a partially circular orbit due to the action of the cranks 76, and the construction of the V-shaped slots 44 is such that the blades 97 can properly move down to make the necessary transverse cuts 98 in the potatoes. The slots 47 and 48 in the end portions 45 and 46 provide clearance to permit the stationary knife 60 to register therewith when the knife 60 is making the longitudinal cut 64 in the potato, as shown in FIGURE 6.

The machine of the present invention further includes a means for temporarily holding the potatoes in the cups 40 during withdrawal of the blades 97 after the transverse cuts 98 have been made, and this holding means comprises the fingers 83 which are arranged between the blades 97, and the fingers 83 are arranged and constructed so that the fingers 83 will be in down position in engagement with the upper surfaces of the potatoes when the knives or blades 97 are starting to move up so that this upward movement of the blades 97 will not lift the potatoes out of the cups 40. After the blades 97 have been withdrawn or removed from the potatoes the fingers 83 automatically move up out of engagement with the potatoes until the next cutting action by the blades 97 and this cycle of operation is continuously repeated in automatic fashion. The mechanism for causing this up and down synchronized movement of the fingers 83 in conjunction with the blades 97 consists of the bushings 79 which are formed integral with the body member 77 or secured thereto, and the bushings 79 have the stem portions 82 of the rods 81 slidable therein, and the springs 84 are retained in place on the stem portions 82 by means of the retainers 85, and these springs 84 function as return springs to normally urge or return the rods 81 and fingers 83 to a raised position after the necessary or desired holding action has been exerted by the fingers 83 on the potatoes. For causing the fingers 83 to travel downwardly into engagement with the potatoes at the proper time, the small rollers 86 are connected to the rods 81 as at 87, and these rollers 86 are adapted to engage and travel around the outer periphery of the wheels or rollers 89, and the wheels 89 remain generally stationary due to their connection to the brackets 88 as at 90. As the body member 77 moves due to the swinging movement of the cranks 76, the rollers 86 will move down and engage the outer periphery of the wheels 89 and travel around the major portion of the outer periphery of the wheels 89, and this action of the rollers 86 traveling around the periphery of the wheels 89 will cause the fingers 83 to move down between the blades 97 with the desired action so as to hold the potatoes in the cups 40 so that when the blades 97 are withdrawn from the potatoes, the potatoes will not be inadvertently lifted out of the cups 40.

The parts can be made of any suitable material and in different shapes or sizes.

Arranged below the intermediate portion of the upper reach or run 57 of the conveyor 34 is the horizontally disposed bed plate or platform 56 which helps prevent the upper run or reach 57 from sagging when downward pressure is applied by the blades 97. Thus, the upper reach of the conveyor chain is adapted to travel along the upper surface of the platform 56 so that the necessary support will be provided for the upper reach of the conveyor chain at the points where there would be normally a tendency for the chain to sag due to downward pressure from the cutting action of the blades 97.

There is also provided on the chain 39 a plurality of pins 51 which are affixed to the chain 39 in any suitable manner, and these pins 51 help stabilize or prevent wobbling of the cups 40 during action of the machine. The cups 40 are connected to the chain by means of the pin or securing element 50 which extends through the lugs 49 on the cups and the securing element 50 is adapted to be suitably affixed to the chain 39.

While the present invention has been described specifically for use in cutting potatoes to form seed potatoes, it is to be understood that in the present invention it can be used for other purposes, as for example it can be used for cutting different types of vegetables, fruits, or the like in addition to its primary use or function as a seed potato cutter.

It will be seen that according to the present invention there has been provided a machine for cutting potatoes up into pieces for seed to plant. With the machine of the present invention, graded potatoes are adapted to be guided into the cups 40 by hand from a hopper placed at a convenient height to facilitate handling, and all potatoes are put in stem end first so as to cut waste to a minimum. Since all pieces that contain eyes will be full size pieces, and nearly uniform, this will facilitate handling in the planter. The machine of the present invention can make from two to eight pieces of each potato according to the length of the potato, just by putting each potato in a cup lengthwise. The knife 60 cuts the potato lengthwise, and pushes it back towards the end portion 45 so that when the cross knives 97 come down, they make uniform cuts, starting at the blossom end of the potato. If there is a small piece left it comes off of the stem end where there are seldom any eyes close, therefore there will be very little waste. Practically all pieces are near uniform which is a big help when put in the potato planter. The cups 40 have concave bottoms, and rounded ends so that the potatoes are easy to center and hold in position for the knives to cut. The platform 56 functions as a brace for reinforcing the chain while the cuts are being made.

Some of the important features or aspects of the present invention are as follows. The machine includes a frame which is constructed for supporting the various elements or parts, and wherein proper tension is maintained at all times on the endless chain 39. The endless chain runs on sprockets 37 and 38, and the chain 39 is timed in unison with the cross cutting knives 97 that are operated by the series of gear units which revolve on the frame above the endless chain, and the chain moves the cups 40 which hold the potatoes 41. Each revolution of the gears 71 and 74 causes the cross cut knives or blades 97 to engage the cross slots 44 in the cups 40 in consecutive rotation. Any number of cups may be used as desired or required. All cups 40 are mounted an equal distance apart, on the endless chain so that the cross cut blades can engage the slots 44 properly. The cups also have the lengthwise slots 47 and 48 for the first knife 60 which is stationary in the frame or support 59 and the knife 60 serves to cut the potato lengthwise as at 64 and also at the same time pushes the potato to the rear end of the cups. The cups have a concave bottom and rounded ends so that the potatoes line up and center easily, and the V-shaped slots which are arranged crosswise and lengthwise permit the knives and blades to engage easily. As the revolving blades 97 operated by the gears move slightly faster than the endless chain 39 which carries the cups 40, the blades are fastened to the bar 93 which operates inside of the hollow sleeve or enlargement 91 on the body member 77, and the blades 97 are held in perpendicular position at all times. When the blades engage the slots 44 in the cups with the potatoes in position in the cups, the bar 93 which holds the blades assumes the same speed as the cups 40 until the cut is made, and the revolutions of the gears disengages the blades from the slots so that the coil spring 95 fastened to the end of the bar 93 which holds the blades, pulls the bar 93 back into position for the next cut. The bar 93 may move approximately three-quarters of an inch.

An important feature of the present invention is that when the gears which revolve the blades on the up movement after making the cuts, a series of fingers 83 extend parallel and between the knife blade 97, and the fingers 83 have operatively connected thereto the coil springs 84 which serve to urge the fingers upwardly out of the way while the cut is being made. When the gears are on an upward movement after the cut is made, the roller or projection 86 engages the corresponding wheel 89 so that the roller 86 goes down and around the wheel 89 and up the other side of the wheel until it disengages from the wheel. This action serves to hold the fingers 83 between the knife blades 97 so that the fingers will be held stationary in a down position for a split second while the knife blades 97 are being raised by the gears. This takes all pieces of cut potatoes out from between the knife blades 97 and leaves them in the cups to be dumped into a receiving receptacle. Then the coil springs 84 pull the fingers 83 back into position for the next cut.

The hopper 52 is arranged adjacent one end of the machine for receiving potatoes from a grader ready to go into the machine 30 of the present invention. A spout or chute 53 at the other end of the machine serves to deliver cut potatoes to a bin or sack. The motor 66 may be a slow speed motor which serves to operate the conveyor and also operates the cross cut knives or blades 97. The sprockets, gears, shafts, endless chain which carries the slotted cups 40, the knives, and the cleaning fingers are all timed to working in unison and suitable adjusting means is provided for maintaining these members properly timed so that as wear takes place by usage, the necessary adjustments can be made. The various bearings and wearing surfaces are adapted to be lubricated by suitable grease fittings or the like.

Minor changes in shape, size and rearrangement of details coming within the field of invention claimed may be resorted to in actual practice, if desired.

What is claimed is:
1. A seed potato cutter comprising a base, a frame connected to said base; a conveyor including shafts supported by said frame, sprockets on said shafts, an endless chain engaging said sprockets; a plurality of cups having lugs swivelly connected to said chain, each of said cups including a bottom portion, side portions having spaced apart slots therein, and said cups further including end portions having diametrically opposed slots therein, one of said end portions being of greater length than the other end potrion, pins affixed to said chain for selectively engaging the bottom portions of said cups, a hopper adjacent one end of said conveyor, a chute adjacent the other end of said conveyor, a platform arranged below the intermediate portion of the upper run of the conveyor chain, a stationary knife adapted to register with the slots in the end portions of said cups, a motor supported on said frame, plate portions on the upper portion of said frame, a horizontally disposed drive shaft extending through said plate portions and operatively connected to said motor, a gear member connected to said drive shaft, a pair of driven shafts extending between said plate portions and arranged in spaced parallel relation with respect to said drive shaft, a pair of gear wheels connected to said driven shaft and said gear wheels meshing with said gear member, cranks operatively connected to said gear wheels; a body member including portions pivotally connected to said cranks, bushings integral with said body member and said bushings having longitudinally extending bores therein, rods having stem portions mounted in said bores and said rods each having a pair of spaced apart fingers arranged at right angles with respect to said stem portions, coil springs arranged above said bushings and circumposed on said stem portions, rollers connected to the stem portions of said rods, a pair of brackets fixed to said frame, wheels supported by said brackets for selective engagement by said rollers; an enlargement on said body member, a bar slidably supported in said enlargement, clamps connected to said bar, a plurality of blades connected to each clamp for selectively engaging and registering with the slots in the side portions of said cups, an arm affixed to said body member, and a spring member connecting said arm to said bar.

2. The structure as defined in claim 1 wherein said fingers interfit with said blades.

3. The structure as defined in claim 1 and further including drive means operatively connecting said motor to said conveyor.

References Cited in the file of this patent
UNITED STATES PATENTS

| | | |
|---|---|---|
| 1,610,236 | Ayars | Dec. 14, 1926 |
| 2,487,719 | Meyer | Nov. 8, 1949 |
| 2,703,595 | Brown | Mar. 8, 1955 |
| 2,956,601 | Fry | Oct. 18, 1960 |